United States Patent
Laniado et al.

(10) Patent No.: US 10,334,974 B2
(45) Date of Patent: Jul. 2, 2019

(54) PERIMETER TRACK TOY

(71) Applicants: Raymond Laniado, Brooklyn, NY (US); Michael Barenboym, Bedford, MA (US)

(72) Inventors: Raymond Laniado, Brooklyn, NY (US); Michael Barenboym, Bedford, MA (US)

( * ) Notice: Subject to any disclaimer, the term of this patent is extended or adjusted under 35 U.S.C. 154(b) by 0 days.

(21) Appl. No.: 15/486,924

(22) Filed: Apr. 13, 2017

(65) Prior Publication Data

US 2017/0303717 A1    Oct. 26, 2017

Related U.S. Application Data

(63) Continuation of application No. 14/810,351, filed on Jul. 27, 2015, now Pat. No. 9,655,465, which is a continuation-in-part of application No. 14/295,622, filed on Jun. 4, 2014, now Pat. No. 9,119,492, which is a continuation-in-part of application No. 14/162,349, filed on Jan. 23, 2014, now Pat. No. 9,090,402, which is a continuation of application No. 13/569,790, filed on Aug. 8, 2012, now Pat. No. 8,668,070.

(60) Provisional application No. 61/522,282, filed on Aug. 11, 2011.

(51) Int. Cl.
| | |
|---|---|
| *B65G 35/06* | (2006.01) |
| *B66B 23/12* | (2006.01) |
| *A47G 23/08* | (2006.01) |
| *A47F 10/06* | (2006.01) |

(52) U.S. Cl.
CPC ............ *A47G 23/08* (2013.01); *A47F 10/06* (2013.01); *B65G 35/06* (2013.01); *B66B 23/12* (2013.01)

(58) Field of Classification Search
CPC ......... B66B 23/00; B66B 23/12; B66B 23/14; B66B 23/145; B65G 35/06; B65G 2201/0258; B65G 17/086; B65G 17/066
USPC .... 198/321, 326, 850–853, 831; 186/38, 42, 186/43, 45, 46
See application file for complete search history.

(56) References Cited

U.S. PATENT DOCUMENTS

| | | | |
|---|---|---|---|
| 751,681 A | 2/1904 | Philippi | |
| 2,166,381 A * | 7/1939 | Taylor | A23G 9/26 198/680 |
| 2,666,519 A | 1/1954 | Boots | |
| 2,737,288 A | 3/1956 | Boots et al. | |
| 2,891,657 A * | 6/1959 | Eubanks | A01D 45/16 198/680 |
| 3,578,148 A | 5/1971 | Pinckard | |
| 3,895,691 A | 7/1975 | Shiraishi | |
| 3,901,355 A | 8/1975 | Shiraishi | |

(Continued)

OTHER PUBLICATIONS

Images from Curviline online product manual.

*Primary Examiner* — James R Bidwell
(74) *Attorney, Agent, or Firm* — Locke Lord LLP

(57) ABSTRACT

A carrier component for a track system may comprise a carrier and a pair of rollers coupled to one another by the carrier. Each of the rollers may include at least one rolling surface configured to engage opposing sides of a track. At least one of the rollers may be spring-loaded and biased toward the other. Alternatively, or additionally, at least one spring loaded roller may include an armature connected to a pivot of the carrier, wherein the armature may be biased by a coil spring for coupling the at least one spring loaded roller with a track.

13 Claims, 22 Drawing Sheets

(56) References Cited

U.S. PATENT DOCUMENTS

| | | |
|---|---|---|
| 3,926,489 A | 12/1975 | Futch |
| 4,216,845 A | 8/1980 | Tashman |
| 4,243,751 A * | 1/1981 | Swartz .................. C01B 3/042 |
| | | 205/687 |
| 4,765,440 A | 8/1988 | Tashman |
| 5,884,753 A | 3/1999 | Robertson |
| 6,170,643 B1 | 1/2001 | Shah |
| 6,935,489 B2 | 8/2005 | Kawasaki |
| 7,090,069 B2 | 8/2006 | Kawasaki |
| 7,168,556 B2 | 1/2007 | Spoeler |
| 7,322,459 B2 * | 1/2008 | Garvey ............. B65G 47/5145 |
| | | 198/341.09 |
| 7,775,346 B1 | 8/2010 | Taylor |
| 7,891,482 B2 * | 2/2011 | Takahashi ............ B23P 21/004 |
| | | 198/581 |
| 8,668,070 B2 | 3/2014 | Laniado et al. |
| 8,851,820 B2 | 10/2014 | Bonora et al. |
| 9,090,402 B2 | 7/2015 | Laniado et al. |
| 9,119,492 B2 | 9/2015 | Laniado et al. |
| 9,655,465 B2 * | 5/2017 | Laniado ................. A47G 23/08 |
| 2004/0124070 A1 | 7/2004 | Okoshi |
| 2004/0178047 A1 * | 9/2004 | Leisner ................. B65G 15/02 |
| | | 198/623 |
| 2005/0247546 A1 * | 11/2005 | Strange ............... B23Q 7/1447 |
| | | 198/793 |
| 2010/0006524 A1 | 1/2010 | Roach |

* cited by examiner

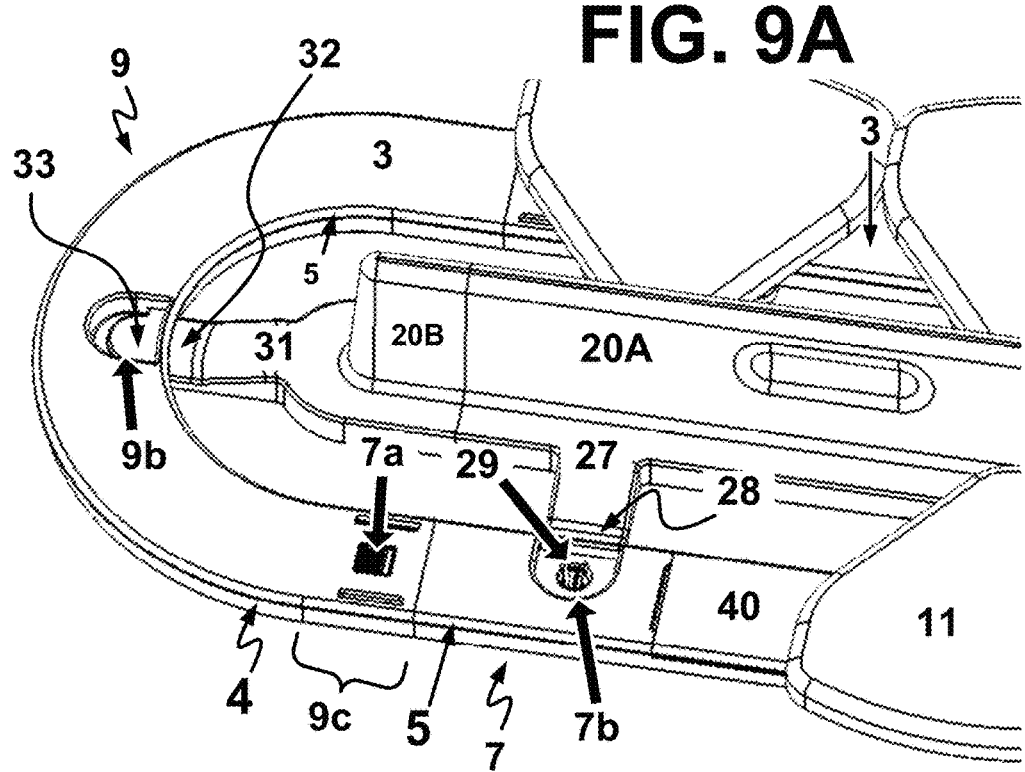

PERIMETER TRACK TOY

RELATED APPLICATIONS

This application is a continuation of U.S. patent application Ser. No. 14/810,351, filed Jul. 27, 2014, which issued as U.S. Pat. No. 9,665,465, which is a continuation-in-part of U.S. patent application Ser. No. 14/295,622, filed Jun. 4, 2014, which issued as U.S. Pat. No. 9,119,492, which is a continuation-in-part of U.S. patent application Ser. No. 14/162,349, filed Jan. 23, 2014, which issued as U.S. Pat. No. 9,090,402, which is a continuation of U.S. patent application Ser. No. 13/569,790, filed Aug. 8, 2012, which issued as U.S. Pat. No. 8,668,070 from a non-provisional patent application that claims the benefit of priority of U.S. Provisional Patent Application Ser. No. 61/522,282, filed Aug. 11, 2011. The disclosures of each of the foregoing applications being incorporated herein by reference in their entirety.

FIELD OF THE INVENTION

This invention relates to service conveyors, for example, service conveyances that present objects along a continuous conveyor.

BACKGROUND OF THE INVENTION

A lazy Susan is a device that comprises a rotating platform that allows objects, typically food, to be presented to persons sitting around a round table. The device comprises a turntable supported on bearings. It is also known to provide circular food service conveyors in which a motor driven conveyor belt displays food to customers seated about a non-circular table. For example in U.S. Pat. No. 4,216,845 there is displayed a conveyor belt onto which food containers are attached and the conveyor belt is driven by a motor in a direction so that all the food in the containers is presented to every person seated around the table. The conveyor is also used as an assembly line to allow food trays to be conveniently loaded with various food portions comprising a meal, used for example by airlines, schools and hospitals.

U.S. Pat. No. 3,901,355 disclosed a circulative catering table having inner and outer sidewalls that defined between them an endless circular path of travel. Food was placed in boxes carried by a conveyor belt and presented to persons sitting around the table by a belt driven by a motor in a single direction.

In order to provide a conveyor for an oblong platform, U.S. Patent Application Publication No. 2010/0006524 A1 disclosed a complex combination of circular gears to present the objects in a configuration defined by two large tangential circles.

It is also known to provide moving surfaces in various configurations that provide luggage carousels at airports by using motor driven conveyors consisting of a series of metal plates that move over one another thereby presenting a continuous moving surface transporting the luggage in various serpentine configurations.

What is desired however is a device that can be placed upon an oblong table and used to present food items to persons seated at the table without the need for a driving motor and allowing each person to bring to him or herself objects by simply reaching out and causing the device to move the items in a continuous path passing close to his or her position at the table. In addition to simplicity in motion, the device may be easily taken apart for cleaning and may be lightweight and made of conventional materials.

It may also be desired to mount a device on a surface and be used to present food and other items to persons located in different locations about a room without the need for a driving motor and allowing each person to bring to him or herself the items by simply reaching out and causing the device to move all the items in a continuous path passing close to his or her position at the table.

SUMMARY OF THE INVENTION

An exemplary track and carrier system may contain any number of carriers of any number of sizes and shapes to fit a particular purpose or purposes. In an embodiment, there are at least two rollers for each carrier to maneuver about a grooved track.

A spring-loaded track roller may be coupled to a groove on the track while on the underside of the carrier. Spring-loaded rollers utilize the deformation resiliency of a spring to keep the roller in substantially constant contact with the track throughout the travel of the carrier. Deformation of the spring in a spring roller may keep the roller part in contact with a groove of the track via an armature connected to a pivot. Spring-loaded roller may allow for disengagement of carriers from the track for removal from the device, storage, maintenance, replacement or customization. A coiled spring and armature system may be utilized as well as a spring connected to a fixed extension on the underside of the carrier.

BRIEF DESCRIPTION OF THE DRAWINGS

FIGS. 9A-B illustrate embodiments of sections of exemplary platforms and oblong lazy Susan structures.

DETAILED DESCRIPTION OF PREFERRED EMBODIMENTS OF THE INVENTION

Figure 1A:
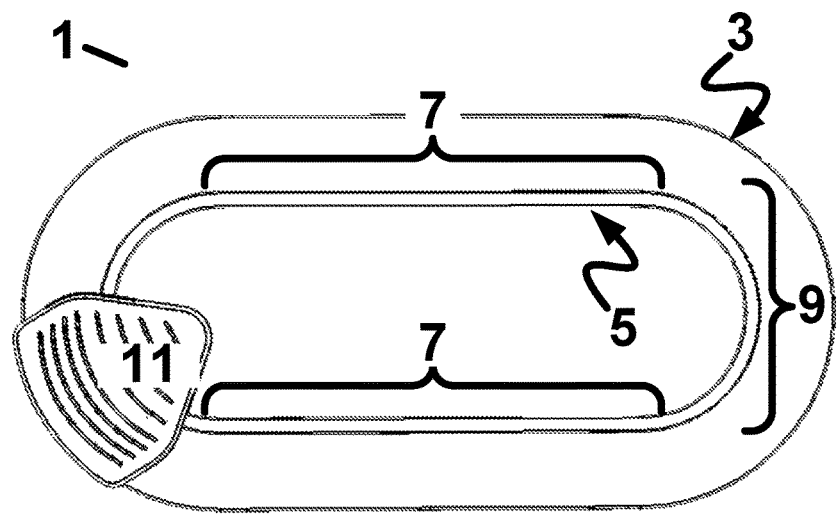
FIG. 1A is a plan view of the supporting platform of an exemplary embodiment of the present invention.

FIGS. 1 through 17A-G illustrate several exemplary embodiments of the present invention described herein. As shown in FIG. 1A, a supporting platform 1 has an upper surface 3 which contains a guidance groove or track 5 having a substantially uniform width and extending in a continuous oblong loop about the upper surface 3. Guidance groove 5 may be a surface below the upper surface 3 into which objects may slide about the platform 1. Alternatively, guidance groove 5 may be a series of tracks extending above surface 3 and providing grooves to accommodate sliding objects. Guidance groove 5 may be made out of the same or different material as platform 1, surface 3 and/or both. An exemplary guidance groove 5 may be a molded portion of platform 1 so as to provide smooth transitional surfaces for objects to slide therein or against. In another exemplary embodiment, groove 5 may contain magnetic strips for magnetic gliding about platform 1. In a preferred embodiment, supporting platform 1 has a flat upper surface 3.

The oblong loop 5 may have substantially straight sides 7 and substantially rounded ends 9 joining the substantially straight sides into a continuous loop. An exemplary oblong loop may comprise a length of straight sides 7 that may be greater than the dimensions of rounded ends 9. It is not required that the sides be perfectly straight or that the ends be portions of a circle. For example, the configuration of an exemplary oblong loop could be an ellipse, or any geometrical shape having a generally oblong character. Alternatively, the loop formed by continuous groove 5 may be formed into a complete circle. Where the ends 9 are not circular, they may nevertheless have a radius of curvature at each point and the generally oblong shape could be achieved by having the sides longer than the average radius of curvature. It is also possible for the ends 9 to be substantially rigid so that the loop 5 takes on the shape of a rectangle with a combination of sides 7 and 9 having substantially different length. Where the loop 5 configuration is substantially rectangular it may be advantageous that its ends 9 have a partial radius for smoothly joining sides 7.

The supporting platform 1 may be made of any suitable material. Platform 1 is preferably made from wood, plastic, or a light metal so that the weight may be kept to a minimum. Preferably, an exemplary supporting platform 1 may weigh only a few pounds fully assembled.

Figure 1B:
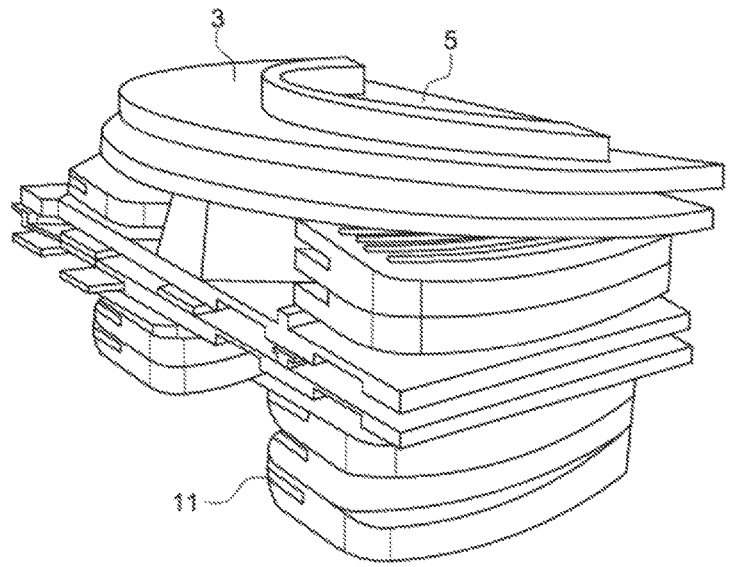
FIG. 1B is an exemplary embodiment of the oblong lazy Susan of the present invention in a folded conformation.

With further reference to FIG. 1B, an exemplary platform 1 may be capable of segmentation or separated into pieces for ease of storage or attachment to other platform 1 components. For example, a platform 1 may be divided into a left, right and center section whereby the left and right sections contained the rounded portions of oblong groove 5 and the center section contains the substantially straight portions of oblong groove 5. In this exemplary embodiment, a segmented platform 1 may be taken apart so the individual sections may be stored in a more convenient storage container or packaging. Such a segmentation capability may also allow platform 1 to grow in size, for example by adding an additional center section to further elongate the oblong groove 5. Alternatively, platform 1 may be made smaller to accommodate a smaller service surface by removal of sections. The segments of platform 1 may engage one another by snapping into place, locking, fastening, sliding, magnetic attraction or any other abutment and/or adjoining mechanisms known to those skilled in the art. It is also conceivable that an exemplary continuous groove 5 may have any number of shapes depending on the number of different segments adjoined to a particular platform 1.

Figure 2A:
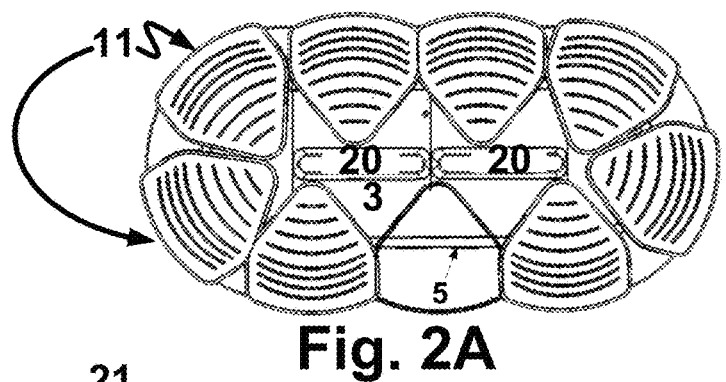
FIG. 2A is a plan view of an exemplary embodiment of the oblong lazy Susan of the present invention.
Figure 2B:
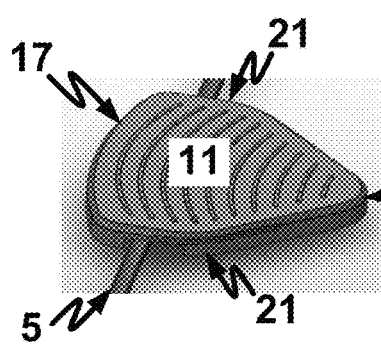
FIGS. 2B-C are perspective views of an exemplary embodiment of the oblong lazy Susan of the present invention.
Figure 2C:
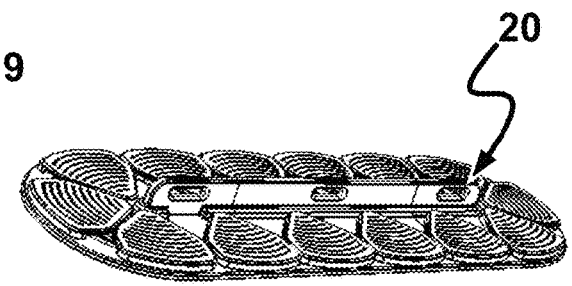

As shown in FIGS. 2A-C, a plurality of carriers 11 may be placed on the supporting platform 1. The carriers are the surfaces upon which food and other items may be placed, either directly or in other repositories such as plates, trays or containers (not shown) which may be capable of attachment to carriers 11. For example, a food-carrying carrier 11 may have space for placement of a food item and a beverage. Alternatively, carrier 11 may have dividers to place different types of foods and/or beverages. Further carriers 11 may be used to hold books, videocassettes, cook ware or other items. An exemplary carrier 11 may not be limited to being flat, but may have any surface (such as, for example, a curved surface, a slotted surface, an indented surface or a combination of these). In a preferred embodiment, an exemplary carrier 11 may substantially maintain the stability of the object placed upon it. Additionally, an optional group of handles 20 may be incorporated into the surface of supporting platform 1 for ease of carrying, moving and/or removing. Preferably, handles 20 may be shaped in any form so as not to interfere with the displacement of carriers 11 about track 5.

An exemplary carrier 11 may comprise a back side 17 facing away from platform 1, abutting sides 21 abutting one or more carriers 11 on track 5 and a narrow end 19 which points inwardly within platform 1. An exemplary carrier 11 may have any number of sides suitable for use in accordance with the disclosures of the present invention. A preferred carrier 11 may be pentagonal with the smallest vertex being narrow end 19, the sides connecting the obtuse angles to the right angles being sides 21 and the end connecting both right angles being back side 17. Alternatively, carrier 11 may be trigonal, octagonal, hexagonal and diamond shaped. Further, according to an exemplary embodiment of the present invention, all carriers on a platform 1 may be similarly shaped. However, carriers 11 may be removable and exchangeable between different platforms 1, thereby allowing for multiple shaped carriers on a single track 5. Thus, an exemplary oblong lazy Susan may contain any number of carriers 11 of any number of sizes and shapes to fit a particular purpose or purposes.

Figure 3:
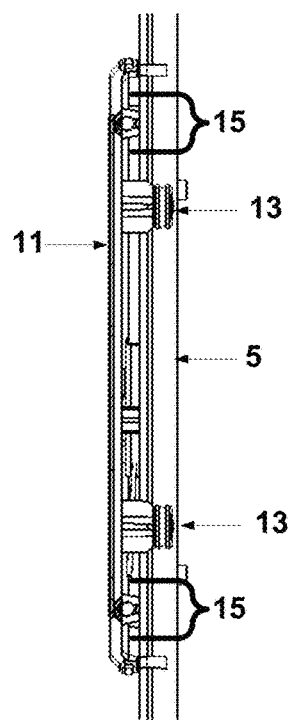
FIG. 3 is a cross section view of an exemplary roller for use in exemplary embodiments of the present invention.

As shown in FIG. 3, a flat carrier 11 may have rollers 13 extending from the lower surface of the carrier 11, that is, the surface facing upper surface 3 of platform 1. The rollers 13 may be placed in a groove within track 5. Use of rollers 13 according to this exemplary embodiment provides a benefit in greatly reducing the friction encountered while moving the carrier around the oblong loop. In a preferred embodiment, in order to fit within a groove in track 5, the rollers 13 should have a diameter no greater than the width of the groove. To provide accurate motion of the carrier, the diameter of a roller 13 should be approximately the same as the width of the groove. In yet another preferred embodiment, there are at least two such rollers 13 for each carrier 11 to maneuver about grooved track 5. It may also be possible for the groove in track 5 to have a configuration that captures the rollers 13, that is, by encapsulating rollers 13 on all sides within a guidance groove surface. According to this embodiment, a portion of groove 5 may allow the rollers 13 to be slipped into position in the groove and engaged so that one or more of the rollers 13 will not slip out.

Figure 4:
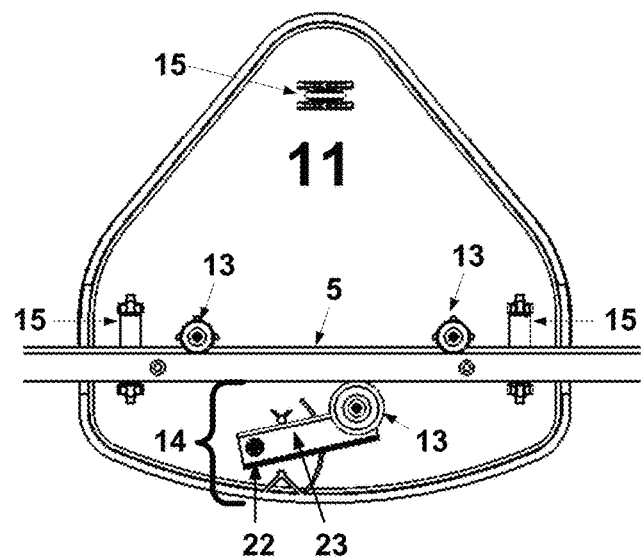
FIG. 4 is a cross section view of a load bearing extension of an exemplary embodiment of the present invention.
Figure 3A:
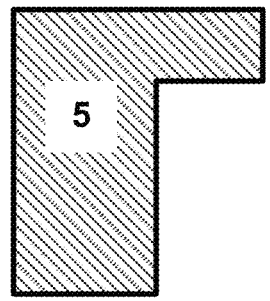
FIGS. 3A-3C are exemplary cross-sections of an exemplary track.
Figure 3B:
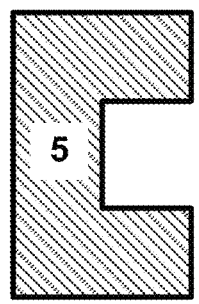
Figure 3C:
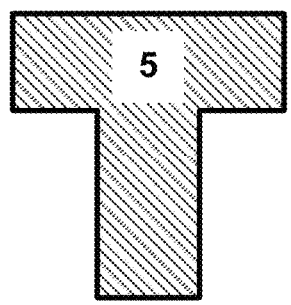

As previously shown and described with respect to FIGS. 1, 3, and 4, track 5 may have a plurality of grooves to accommodate rollers 13, 15, and others with exemplary cross-sections of the types shown in FIGS. 3A-3C. Variations and combinations of these grooves are permissible without departing from the scope and objectives of the present invention.

In an exemplary embodiment according to one aspect of the present invention, the rollers are not preferred to bear the weight of the flat carrier 11 and its contents. According to this exemplary embodiment, there is a plurality of load bearing extensions 15 extending from the lower surface of the carriers 11 as shown in FIGS. 3 and 4. While load bearing extensions 15 may rest upon the non-grooved portion of track 5, as illustrated by the bottom two rollers 15 in FIGS. 3 and 4, load bearing extensions 15 may reside in an alternative groove in track 5 or may be in contact with upper surface 3 of platform 1, as shown by the upper most roller 15 in FIG. 4. While shown as single rollers, load bearing extensions 15 may be any mechanical means to avoid substantial transfer of mechanical loads to rollers 13 and/or track 5. An exemplary load bearing extension 15 may be a roller similar to roller 13 but which rests upon upper surface 3 of platform 1. Alternatively, load bearing extension 15 may be a ball and socket roller, like that found in a computer mouse or the ball point of a ball point pen, which is also in contact with upper surface 3 of platform 1. Load bearing extension 15 may be made of the same or different material as any of the components of an exemplary oblong lazy Susan. Upper surface 3 may have additional tracking, grooves or surface features for receiving load bearing extensions 15 wherever they may be placed about carrier 11 to facilitate operation of the carriers 11 in use of the device.

With further reference to FIG. 4, a spring loaded track roller 14, comprising a roller 13, may be coupled to a groove on track 5 like other rollers 13 present on the underside of carrier 11. Unlike other rollers 13, spring loaded roller 14 utilizes the deformation resiliency of a spring to keep the roller 13 of spring loaded roller 14 in substantially constant contact with track 5 throughout the travel of carrier 11 about upper surface 3. Deformation of the spring in spring roller 14 may keep its roller 13 in contact with a groove of track 5 via an armature 23 connected to a pivot 22. A benefit for spring loaded roller 14 may be to maintain rolling contact with grooves in track 5 in the absence of a radius of curvature about track 5, when sides 9 lack a radius of curvature. Alternatively, spring loaded roller 14 may serve to allow for disengagement of carriers 11 from track 5 for removal from the device, storage, maintenance, replacement or customization. In an exemplary embodiment, pressing a carrier 11 so as to further deflect the spring in a spring loaded carrier 14 may also displace non-spring loaded rollers 13 distally from groove 5 allowing carrier 11 to be lifted off of track 5. While spring loaded roller 14 has been described in terms of a spring and pivotable armature, a coiled spring and armature system may be utilized as well. Alternatively, roller 13 connected only by a spring to a fixed extension on the underside of carrier 13 may also be suitable. Those skilled in the art may recognize various means for using spring engagement of rollers to maintain beneficial contact between carrier 11 and track 5.

While rollers 13 have been described as a means to couple carrier 11 to track 5, rollers 13 may be replaced with magnets with the same polarity as magnet strips within or on track 5. When placed upon magnetic track 5, carrier 11 may be able to float based on the magnetic repulsion of the similarly polarized magnetic strips within or on track 5 and the magnets replacing rollers 13. According to this exemplary embodiment, magnetic repulsion coupling between carrier 11 and track 5 allows for carriers to glide about platform 1 on track 5. While a magnetic gliding array may be used for the purposes of this exemplary embodiment, utilizing a spring loaded roller or magnet may be beneficial to allow similar removal of carrier 11 from track 5. A combination of magnets and rollers may also be utilized in accordance with the various embodiments disclosed herein.

Figure 5:
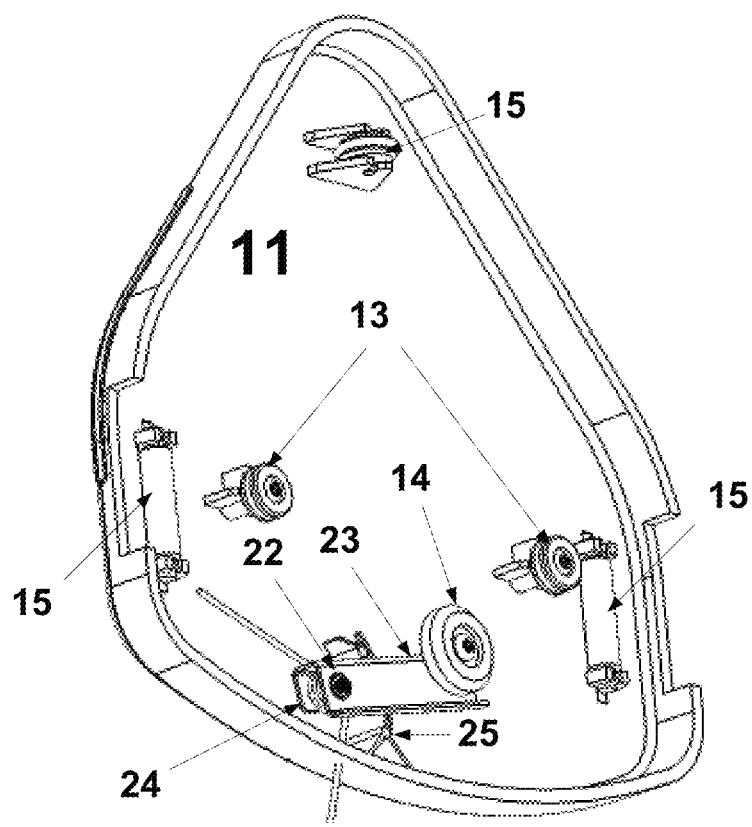
FIG. 5 is a cross section view of a load bearing extension in relation to the rollers of an exemplary embodiment of the present invention.

FIG. 5 provides another view of how load bearing extensions 15 are situated with respect to rollers 13 and the lower surface of carrier 11. Also visible is pivot point 22, armature 23 and coil spring 24 of spring loaded roller 14. While spring loaded roller 14 armature 24 may pivot about pivot 22 and an arc track 25, armature 24 may be free to rotate about pivot 22. Where spring loaded roller 14 may be a ball and socket type roller, armature 23 may be a cylindrical arm with spring 24 contained therein. A roller ball (not shown) may be lodged in the cylindrical armature 24 so that a rolling surface stays in contact with a surface of grooved track 5 and the other rolling surface is in contact with spring 24. In this exemplary embodiment, as roller ball responds to movement of carrier 11 about grooved track 5, the rolling contact of roller ball 14 not in contact with grooved track 5 may cause deflections in spring 24 in the cylindrical armature to accommodate the path of carrier 11 about platform 1.

Figure 6:
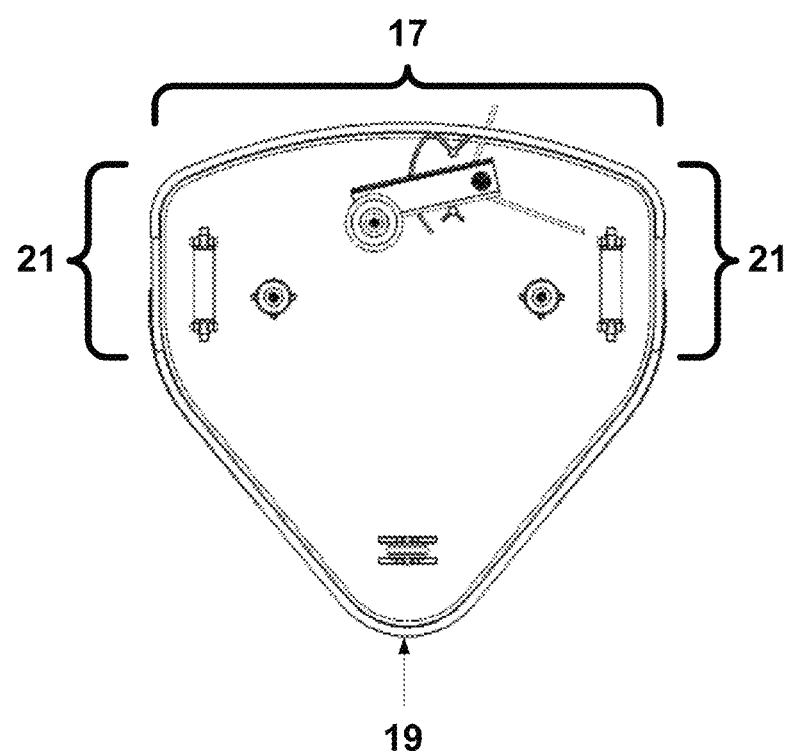
FIG. 6 is a plan view of a flat carrier of an exemplary embodiment of the present invention.

An exemplary carrier 11 is depicted in FIG. 6. As previously described, carrier 11 may have a wide end 17 and a narrow end 19. As shown in FIG. 2, the narrow end 19 faces into the interior of the loop formed by groove 5 and the wide end 17 faces outward from the loop 5. An exemplary carrier 11 has sides 21 that may be generally perpendicular to the wide end 17 of carrier 11, gradually converging to the narrow end 19. The shape of carrier 11 facilitates controlled and smooth motion of adjacent carriers about an oblong circuit which may be defined by grooved track 5. An exemplary carrier has a pentagonal shape, but may be shaped in other ways to effect smooth motion about the oblong circuit or loop defined by groove 5.

Exemplary carriers 11 may be arranged to almost abut when one is pushed along the groove 5 to move the next adjacent carrier 11. In a preferred embodiment, on a standard table surface, the number of carriers 11 may be an odd number so that when one is in the center of a curved end of the loop 5, another carrier 11 is not at the center of the other curved end of the loop. An even number of carriers 11 may also be preferred depending on table size, length of track and geometries of the carriers 11. According to this preferred embodiment, the additional effort to move a carrier around the curve is not the same at both ends simultaneously. Since greater effort may be needed to move a carrier at the distal portions of the loop, the system provides for less expenditure of effort to achieve carrier movement at both ends simultaneously. By shaping the carrier with a narrow end facing inward, the forces needed to move the carriers around the curved end of the oblong loop may be reduced. In general, the carriers move by abutting each other. However, the motion could be accomplished by different means for joining the carriers or spacing the carriers from one another. Such means could include bumpers, chain linkages, magnetic repulsion, or other means of tying or deflecting the carriers to and from each other known to those skilled in the art. An exemplary joining means may be a combination of spring bracket and traction roller. Using a magnetic siding on sides 21 of an exemplary carrier 11, an adjacent carrier with a magnetic siding of like polarity will be deflected away from the first carrier 11, so that when the first carrier is moved, a combination of magnetic force and physical contact will facilitate movement in the next adjacent carrier as well as each additional carrier about the loop.

As has been disclosed with respect to interrelated embodiments of FIGS. 1A-B and 2A-C, an exemplary platform 1 and carrier 11 system may be segmented into components that may be mechanically connected or held by friction couplings, as is known to those skilled to the art and those described. For example, according to the illustrative embodiment of FIG. 7, an oblong track 5 may extend from an upper surface 3 of an oblong platform 1. Handle or divider 20 may be further illustrated as a combination of mechanically interconnecting components using the same or similar mechanical coupling mechanisms described previously and known to those skilled in the art.

Figure 9B:
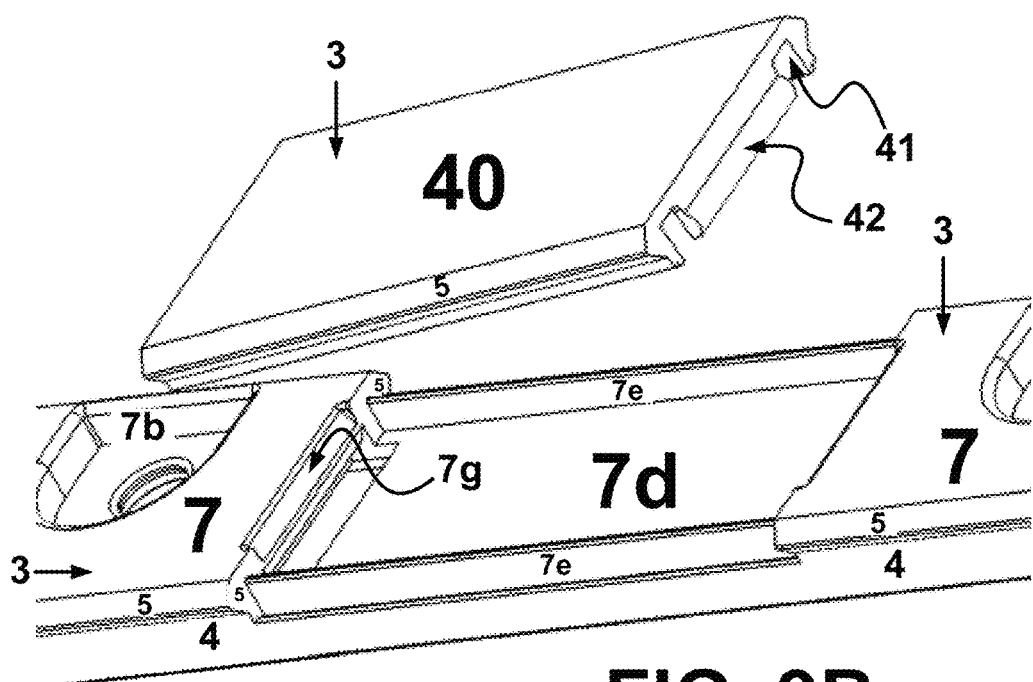
Figure 10:
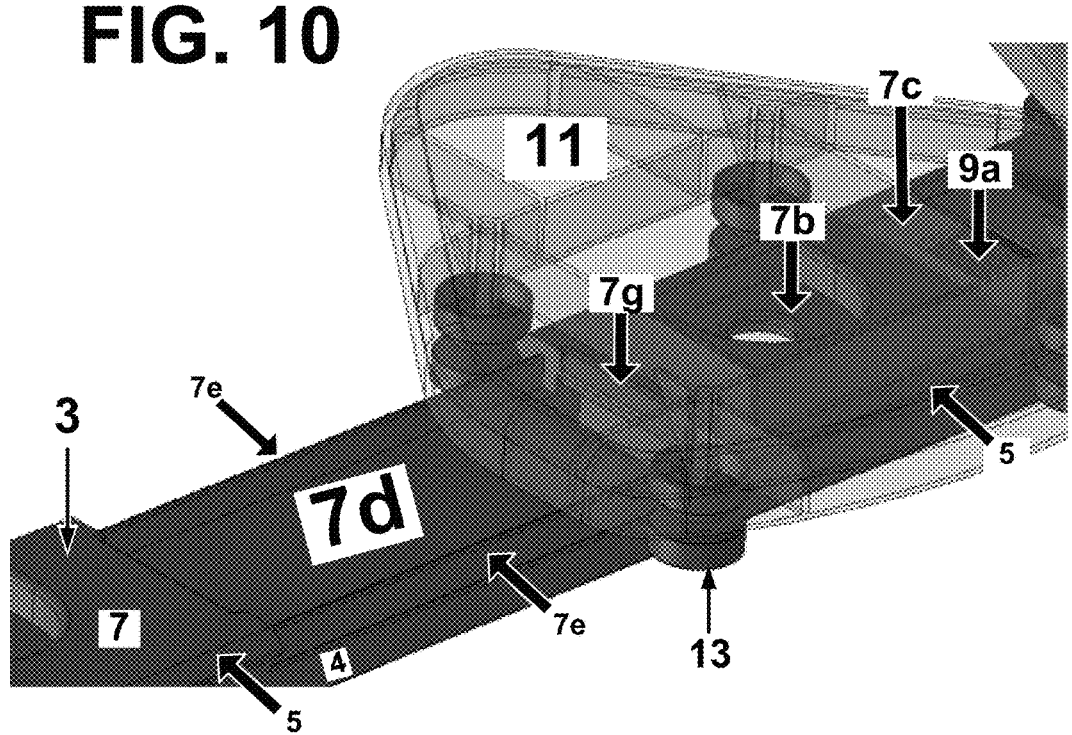
FIG. 10 illustrates another embodiment of sections of exemplary platforms and oblong lazy Susan structures.

As another example, the illustrative embodiments of FIGS. 1A-1B, 2A-C, 9A, 10, and 12A may be interrelated so as to provide one or more carriers 11 whose surface contours (as shown in FIGS. 1A-B and 2A-C) comprise sub-surfaces 7b (as shown in FIGS. 9A 10, and 12A) that are shaped to allow passage, containment, and/or sliding reception of rollers 13. Additionally, one or more topical structures may be coupled to the upper-most surface of an exemplary carrier 11 that may serve as holders, trays, and/or other ornamentation. In one embodiment, the topical structure may "lock" into place atop carrier 11. In another exemplary embodiment, the wheels of the roller 13 may all be located in their own individual sub-surface 7b in a corresponding carrier 11, so that substantially all of the carriers 11 may be stacked atop one another to reduce gaps between carriers 11.

Figure 18:
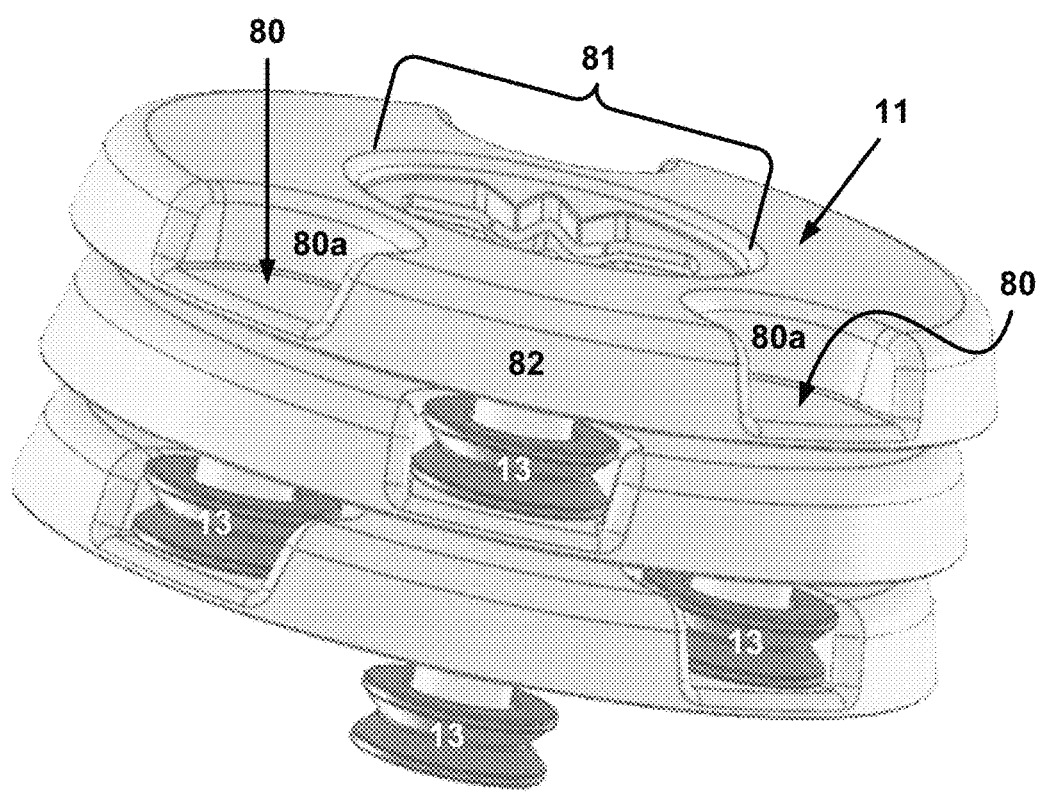
FIG. 18 is an exemplary embodiment of a stackable carrier arrangement with recesses for insertion of another carrier's rollers.

In the illustrative embodiment of FIG. 18, an exemplary set of carriers 11 may have a plurality of recesses 80 of depth 80a. Recesses 80 may be shaped so as to fit the circumference of an exemplary roller 13 at a depth 80 a substantially the same as carrier 11 thickness 82. In an exemplary embodiment depth 80 is less than thickness 82. In another exemplary embodiment, depth 80 is substantially equal to thickness 82. According to another exemplary embodiment illustrated by FIG. 18, port 81 may be an adaptor hole, snap-fitting, or other form of attachment mechanism or device to receive a cover (not shown) that sits atop carrier 11. Thus, a carrier 11 with port 81, with or without the aforementioned recesses 80, may have infinite variability in the type of surfaces on which objects can be placed. Accordingly, carriers 11 can take a shape or form that allows for mobility about platform 1 while port 81 allows the user to place objects of sizes that might not otherwise be held by carrier 11 on the carrier 11 cover nonetheless.

Figure 7:
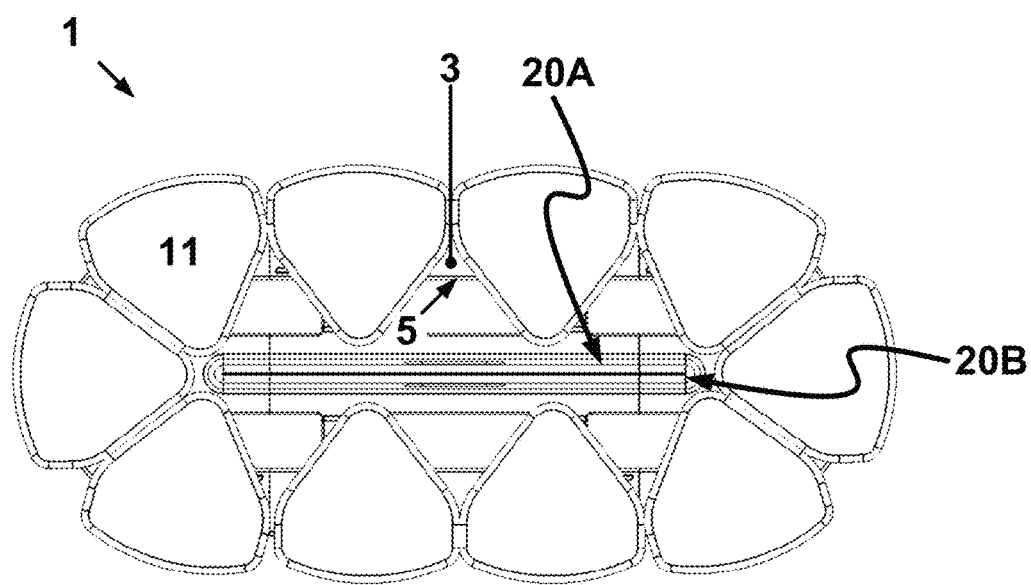
FIG. 7 is another plan view of an oblong lazy Susan according to another exemplary embodiment of the present invention.
Figure 8:
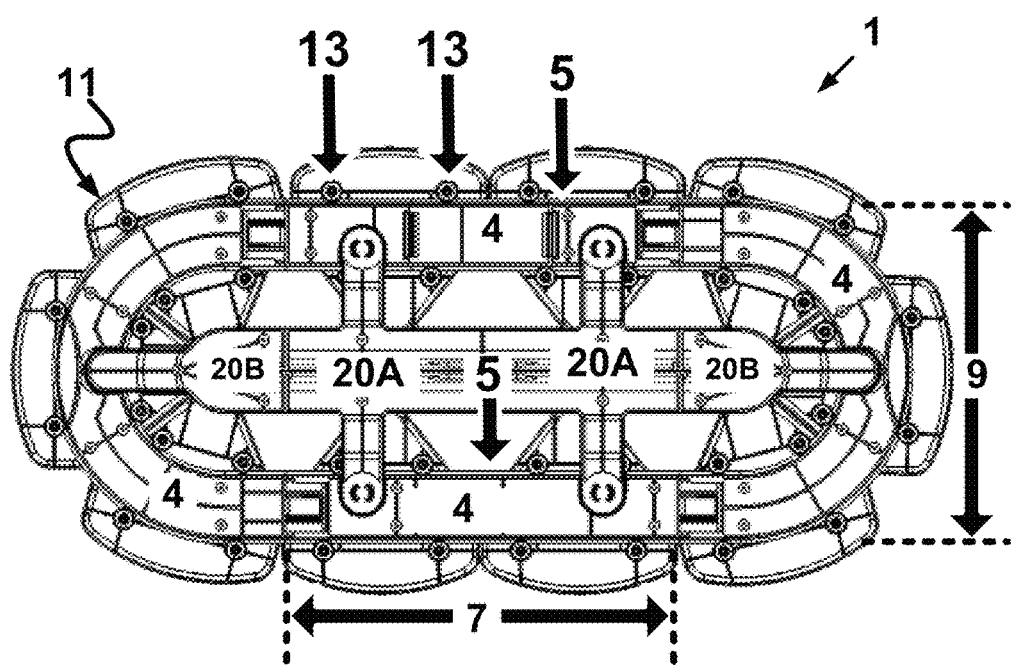
FIG. 8 is another plan view of a supporting platform according to another exemplary embodiment of the present invention.

According to the illustrative embodiments of FIGS. 7 and 8, main handle 20a may be a larger holding surface that couples to the platform 1 at an array of snap-in or friction coupling sites, preferably located on lower surface 4 of platform 1. Sub-handles 20b may be smaller handle portions that couple to platform 1 at different points. In one embodiment, main handle 20a couples to straight portions 7 of loop 5 while sub-handles 20b couple to curved portions 9 of loop 5. In another embodiment, main handle 20a couples to a plurality of components while sub-handles 20b couple to only one component. In a preferred embodiment, main handle 20a couples to straight portions 7 while sub-handles 20b couple to curved portions 9. Those skilled in the art may realize that handle 20 may be constructed and mechanically assembled from various main and sub-handles 20a and 20b, respectively, so as to be circumscribed by the final design of platform 1. For example, if platform 1 were to be an oval shape, sub-handles 20b would couple to main handle 20a so as to couple and hold an oval structure. Alternatively to the above embodiments, dividers 20a and 20b may be used to separate contents loaded on carriers 11 about platform 1.

As previously disclosed, handles 20a and 20b may be designed so that they do not interfere with the travel of carriers 11 and/or their rolling surfaces 13 about track 5. According to the illustrative embodiment of FIG. 9A, an exemplary platform 1 may be illustrated as a collection of various components and coupling sites. While the upper surface 3 of straight portions 7 and curved portions 9 of loop 5 may be continuous, e.g., substantially flat or smooth, it need not be so. For example, as illustrated in FIG. 9A, upper surface 3 may have one or more sub-surfaces 7b and 9b to which handle 20a and sub-handle 20b couple. According to the illustrative embodiment of FIG. 9A, handle 20a may couple to platform 1 via arm 27 so as to provide snap surface 29 through lower surface 4 to mechanically fasten handle 20a to straight section 7 at docking station 7b. An exemplary mechanical fastening mechanism may be friction fitting, snaps, or bolts and screw. Those skilled in the art can achieve the illustrated and contemplated docking with other known mechanical coupling techniques. Further, sub-handle 20b may couple to platform 1 via arm 31 to the lower surface 4 of curved portion 9 via docking station 9b. An exemplary docking station 9b may be a complementarily shaped reception area for the finger 33 of arm 31 of sub-handle 20b. While the illustrative embodiment of FIG. 9A may show docking of arms 27 and 31 of handle 20a and sub-handle 20b to be different, either docking method may be used for either handle arm, or the same method be applied to both.

As illustrated in FIG. 9A and previously disclosed, handle arm 27 elbow 28 and handle arm 31 elbow 32 may be sized and shaped to provide clearance for rollers 13 of carriers 11 as they travel about track 5 of platform 1. In one example, the distance between elbows 28 and 32 of handle 20a arm 27 and handle 20b arm 31, respectively, may be a height of lower surface 4 of platform 1. Alternatively, elbows 28 and 32 may be contoured so that a particular size and shape of roller 13 may pass unhindered as its respective carrier 11 is mobilized about platform 1.

Figure 11:
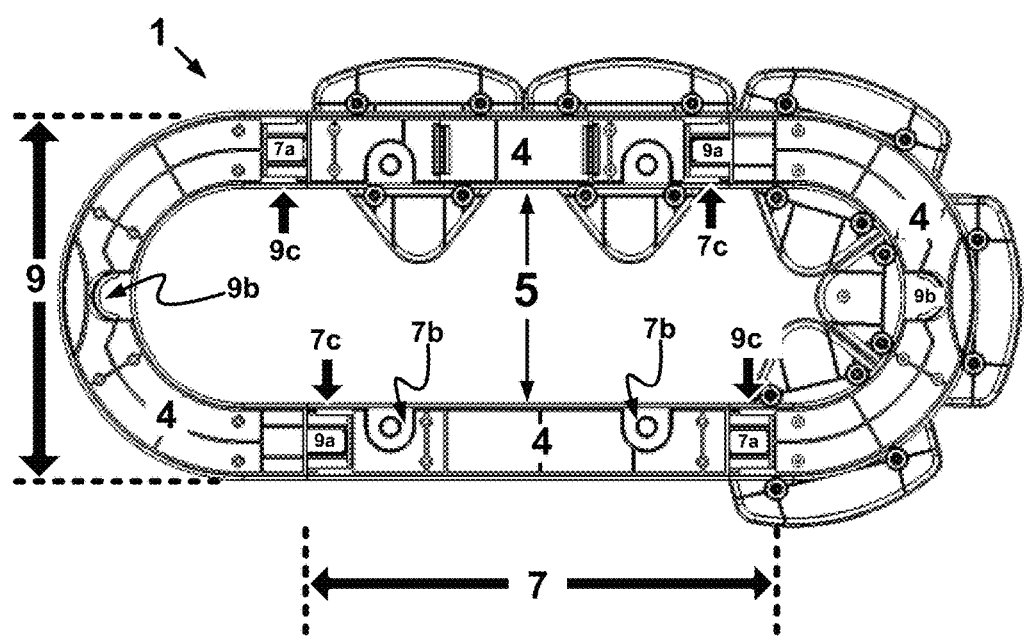
FIG. 11 is another plan view of a supporting platform according to another exemplary embodiment of the present invention.
Figure 12:
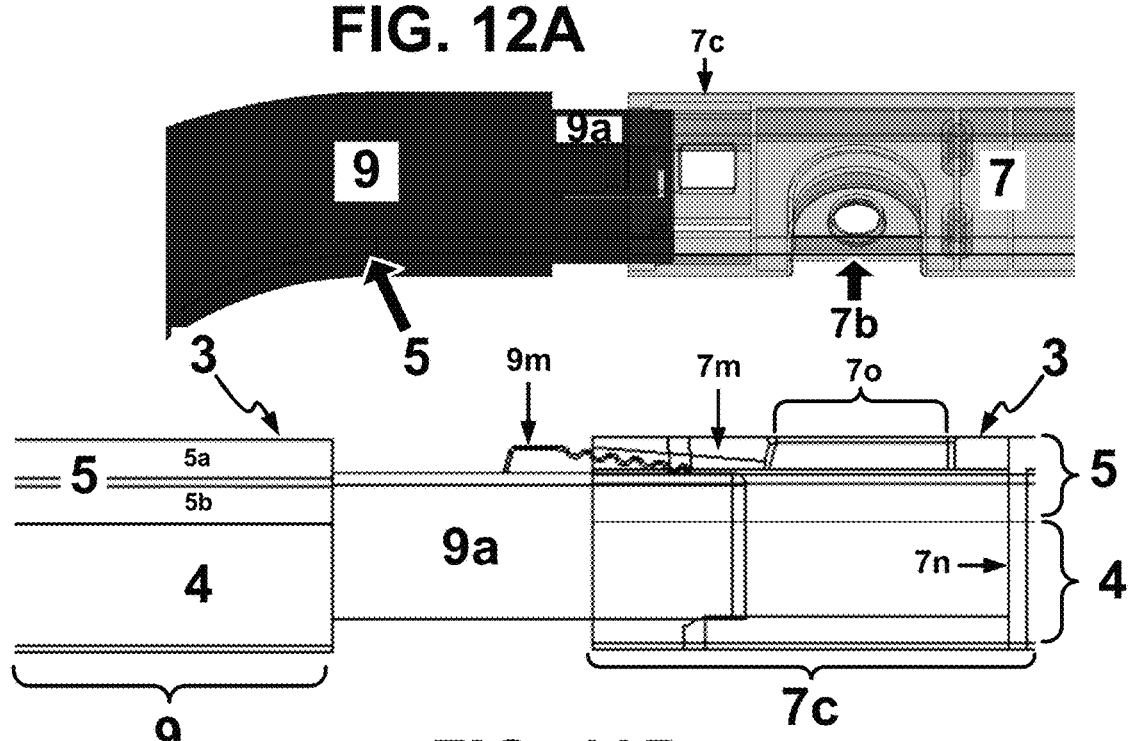
FIGS. 12A-B illustrate embodiments of sections of exemplary platforms according to other exemplary embodiments of the present invention.

In accordance with other embodiments previously disclosed and illustrated in FIGS. 9A, 11, and 12A, upper surface 3 may have additional contours in the form of male joint 7c and 9c and female joints 7a and 9a. As previously disclosed, straight portion 7 of loop 5 on platform 1 and curved portion 9 of loop 5 on platform 1 may be coupled by any known mechanical means, including snaps and friction fittings. According to the illustrative embodiment of FIG. 9A, snap 7a mates with hole or window 9c in the curved portion 9. Another contour in upper surface 3 may be loading section 40. While upper surface 3 may vary as per the various embodiments described, track 5 may remain substantially continuous regardless of the variations in upper surface 3. Accordingly, track 5 may extend from an otherwise uneven and discontinuous upper surface 3 of platform 1, but may be substantially even and continuous about platform 1.

With further reference to the disclosures herein, including the illustrative embodiment of FIG. 12B, portions 9 and 7 of platform 1 may be coupled in a male-female relationship. While FIG. 12B may illustrate the male portion of section 9 and female portion of section 7 of platform 1 in an exemplary mechanical coupling arrangement, similar mechanical coupling arrangements may be had for sections 7 to sections 9, e.g., a male joint 7a of section 7 coupling to a female joint 9c of section 9. As illustrated in FIG. 12B, an exemplary mechanical coupling may substantially align the track 5, upper surface 3, and lower surface 4 on the platform sections 7 and 9 to promote a substantially continuous track 5, a substantially continuous upper surface 3, a substantially continuous lower surface 4, or a combination of these. In an exemplary coupling arrangement, a tab 9m extending upwardly from male joint 9a may frictionally engage a tapered under surface 7m of female joint 7c. After passage beyond under surface 7m, male joint 9a may substantially abut joint end wall 7n, so that tab 9m may be displaced within port 7o. In accordance with previous disclosures, a plastic fabrication of portion 9 may allow for plastic deformation at tab 9m so as to deflect towards male joint 9a when passing under undersurface 7m and deflect away from male joint 9a when passing under port 7o. Upon such passage, the distal deflection of tab 9m may mechanically couple portion 9 male joint 9a within female joint 7c. While port 7o may be rectangular, it may be any suitable shape to allow tab 9m to couple the male joint 9a to the female joint 7c. The same or similar coupling engagement described may be applicable to male joint 7a within female joint 7c.

For example, in the illustrative embodiment of FIG. 9B, loading section 40 may be displaced or completely removed from platform 1 structure to allow adding or removal of carriers 11. Loading section 40 may have one or more coupling geometries 42 and alignment guides 41. Coupling geometries, like the other mechanical coupling mechanisms previously described, may be friction couplers, and as illustrated as a preferred embodiment, a cylindrical lip 42 that fits snuggly within a cavity 7g or 8g (not shown) on the platform 1. In another exemplary embodiment, loading section 40 may be configured so that track 5 is substantially continuous with the track 5 on the portion of platform 1 to which it may be coupled or integrated. For example, in the illustrative embodiment of FIG. 9B, track 5 on loading section 40 may be substantially aligned with track 5 on platform portion 7 when placed thereon. An exemplary method of coupling loading section 40 to platform 1 may be placing alignment guides 41 in friction-fit coupling with stalls 7e of loading bay 7d. Coupling geometry 42, which may be cylindrical, trigonal, or any other prismatic or contoured surface suitable to be received in a complimentarily shaped cavity 7g, may be slid into cavity 7g at one end of loading bay 7d and then placed into an opposing cavity 7g at the other end of 7d to form a substantially continuous track 5 and/or continuous upper surface 3. According to one embodiment, loading section 40 may be comprised of sides containing only a section of track 5 adjacent to alignment guides 42. In another embodiment, loading section 40 may be comprised of sides containing both a section of track 5 and a portion of lower surface 40 adjacent to alignment guides 42.

In another embodiment, loading section 40 may be a telescoping construct comprised of shells of overlapping pieces that extend across a depression space 7d. Such a telescoping structure may align on tracks, such as 7e, or by other suitable means. Thus, an exemplary telescopic loading section 40 may be made of a first section that has a width and dimension substantially the same as that of platform 7. Adjacent to and overlapped by the first section is a second section that has a width and dimension less than that of the first section, but sized accordingly to slide within the first section. Each additional section may likewise be sized so as to collapse underneath the immediately preceding section so that the loading section may be reduced in size. Alternatively, platform section 7 may have a tunnel into which the largest section of the telescoping loading section 40 may be housed when not in use. According to this alternative embodiment, loading section 40 may be telescoped underneath upper surface 3 of platform section 7 and be out of view.

As previously disclosed, and in particular, with respect to the illustrative embodiment in FIG. 10, an exemplary carrier 11 may be loaded onto a portion of track 5 of platform 1 via the space provided by removing loading section 40. In an exemplary method, upon disengagement of loading section 40 from platform 1, an exemplary carrier 11 may have rolling surfaces 13x aligned to engage track 5 first followed by rolling surfaces 13. According to this exemplary method, the carrier 11 may be rollingly coupled to track 5 at a point distal of loading bay 7d and when sufficient clearance exists, loading section 40 may be coupled back to the portion of platform 1, as illustrated in a preferred embodiment, straight section 7, according to the previously disclosed embodiments related to loading section 40.

Figure 13:
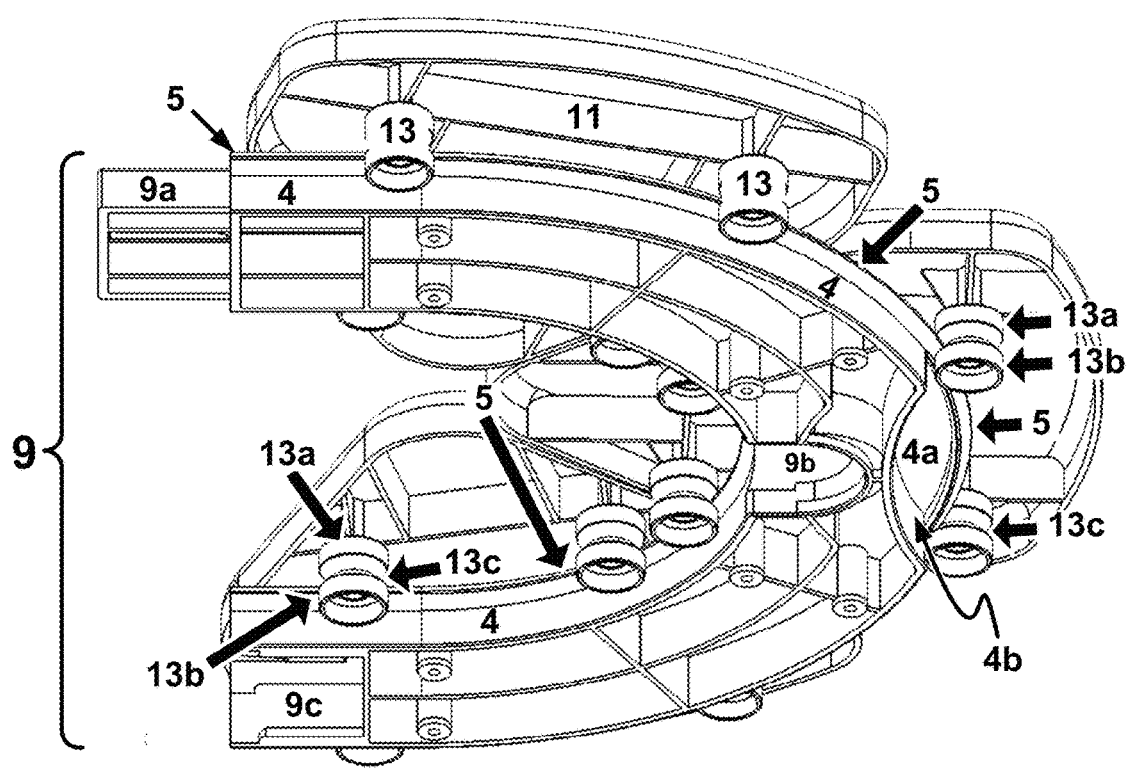
FIG. 13 illustrates another embodiment of sections of exemplary platforms and oblong lazy Susan structures.

As previously disclosed and, in particular, as illustrated in FIG. 13, an exemplary curved portion 9 of track 5 may be attached to an equally curved platform 1 comprised of an upper surface 3 and a lower surface 4. Lower surface 4 may be divided into a lower lateral surface 4a and a lower normal surface 4b. As illustrated and previously described, a track 5 may extend from an upper surface 3 away from the main platform 1 and lower normal surface 4b. Thus, track 5 creates a groove in platform 1 in which rolling surface 13b of roller 13 travels, as previously illustrated and described in FIGS. 3-4. As described in this particular embodiment, the extension of track 5 from platform 1 may be created with an extension of upper surface 3 and lower lateral surface 4a. Thus, track 5 may be configured to travel about the platform 1 perimeters via discontinuous surfaces, e.g., lower lateral surface 4a, so as to create grooves in platform 1 that are deeper than the distance from track 5 to platform 1. As illustrated, such an arrangement may be useful to lighten platform 1 or eliminate unnecessary material during fabrication of an exemplary platform 1. According to the aforementioned disclosed embodiment this "T" configuration may be used to limit the size of the platform while strengthening track 5 so as to handle additional loads from carrier 11.

In another illustrative embodiment of FIG. 13, an exemplary rolling surface 13 may be capable of engaging track 5 at an upper rolling surface 13a, a lower rolling surface 13b, and rolling groove 13c. As previously disclosed with respect to FIGS. 3-4, lower rolling surface 13b travels within a groove formed by platform 1 and track 5. More particularly, track 5 and normal lower surface 4b may create a groove in which lower roller 13 rolling surface 13b travels. An alternative grooved surface may be formed between track 5 and upper surface 3 in which upper rolling surface 13a may travel. As previously disclosed with respect to FIGS. 3-6, upper rolling surface 13a may operate as a load bearing extension 15 from carrier 11. According to a preferred embodiment, upper rolling surface 13a is a load bearing extension 15. According to the illustrative embodiments of FIGS. 13 and 14A-B, rolling surfaces 13a and 13b need not contact any part of lower surface 4 or upper surface 3 to engage track 5 and operate as disclosed. Instead, track 5 may form a groove between itself, lower lateral surface 4a, and lower normal surface 4b such that lower rolling surface 13b does not contact any other part of platform 1 except for lower track face 5b. In an alternative embodiment, lower rolling surface 13b may contact a portion of lower lateral surface 4a and not lower normal surface 4b. However, the former arrangement may be preferred. Additionally, track 5 may be shaped so that no other portion of upper surface 3 need be formed to create a groove between track 5 and upper surface 3. According to this variant of the previously disclosed exemplary embodiment, upper track face 5a may be the only rolling surface for upper rolling surface 13a. While track faces 5a and 5b have been disclosed, any number of track faces may be utilized to accommodate complementary rolling surfaces 13a, 13b, and/or 13c, of rollers 13. While these disclosures of an exemplary track 5 and platform 1 relate to upper surface 3 and lower surface 4, they apply equally to sub-surfaces 7c and 9c. More specifically, track 5 may be configured to allow rollers 13 to travel about it without contacting sub-surfaces 7c or 9c while in operation. In these embodiments, the groove formed by track 5 and sub-surface 7c/9c may coincide with the portion of handles 20a/20b which dock thereto. Thus a portion of the groove formed in these exemplary embodiments may be for both travel of rollers 13 and docking of handles 20a and 20b. In like manner, rollers 13 may be able to traverse track 5 without contacting the interior walls of sub-surfaces 7b or 9b. In an alternative embodiment, rollers 13 may contact lower surface 4 during operation to transmit loads or induce friction during carrier system operation about platform 1.

Figure 14A:
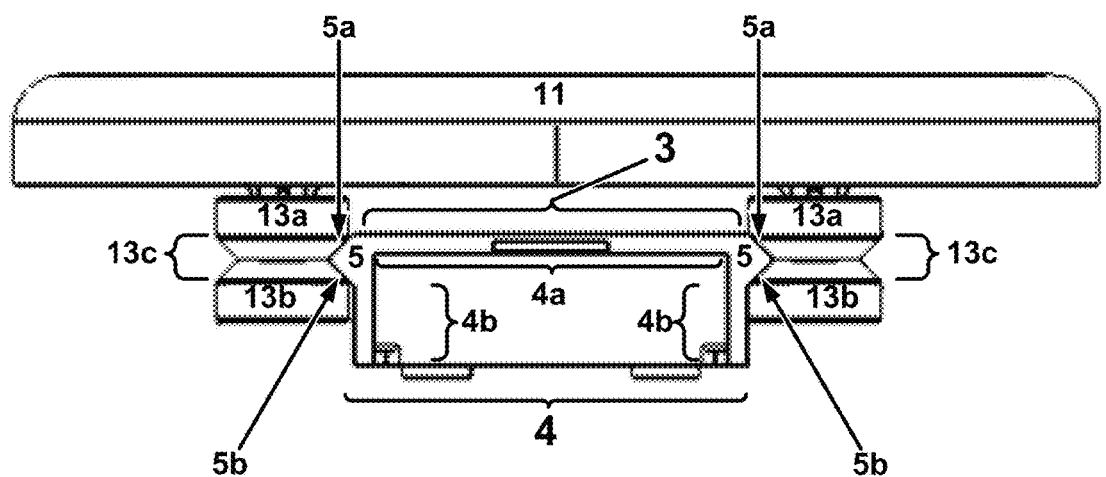
FIGS. 14A and 14C are cross section views of exemplary carriers and platforms for use in exemplary embodiments of the present invention.
Figure 14B:
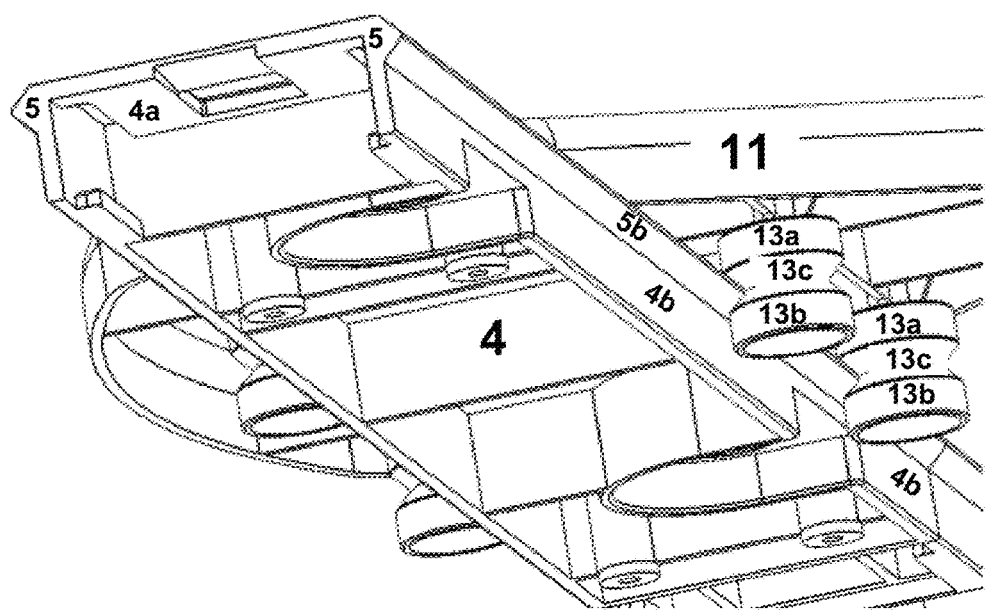
FIG. 14B is a perspective view of an exemplary carrier as used on an exemplary portion of a platform according to exemplary embodiments of the present invention.

An exemplary carrier as previously disclosed and described with respect to FIGS. 3-6 may be further illustrated with respect to FIG. 14A. According to the exemplary illustrative embodiment of FIG. 14A, carrier 11 may be shaped to travel about track 5 on platform 1 and carry objects on its uppermost surface. As previously described, a plurality of grooved rolling surfaces 13 may travel about track 5 extending about upper surface 3 of platform 1. Track 5 may have a variety of cross sections which complement the rolling surfaces 13a, 13b, and/or 13c of rollers 13. According to one illustrative embodiment, track 5 may have a plurality of faces, e.g., upper track surface 5a and lower track surface 5b, on which an upper rolling surface/load bearing extension 13a/15 and a lower rolling surface 13b may travel. Further, an intermediary rolling surface 13c may or may not contact track 5. In another alternative embodiment, track 5 may be wedge-shaped so that the conical portions 13c of upper rolling surface 13a may roll on upper track surface 5a while a conical portions 13c of lower rolling surface 13b may provide engagement and load support against lower track surface 5b. In another embodiment, lower rolling surface 13b need not contact track 5. In yet another embodiment, intermediary rolling surface 13c may be the only portion of roller 13 which contacts track 5. In yet another embodiment, only rolling surfaces 13a and 13b contact track 5. While the illustrative embodiment of 14C may show lower rolling surfaces 13b contacting lower normal surface 4b of platform 1, this is not required to practice the invention. An example where rollers 13 need not contact lower surface 4 (either lower normal surface 4b or lower lateral surface 4a) may be illustrated with respect to FIG. 14B and traversal of rollers 13 about sub-surface 7b. Additional examples of non-contact with lower surface 4 may be further found in embodiments related to loading portion 40 and engagement of carrier 11 rollers to platform 1 after loading portion 40 has been removed. Referring back to FIG. 14A, as previously disclosed, track 5b and lower surface 4 of platform 1 form a first groove in which roller 13 travels. Additionally, FIG. 14A may illustrate an additional groove comprised of top track surface 5a with respect to upper surface 3, which forms a ridge for reception in roller 13.

An exemplary roller 13 may be comprised of a load bearing extension 13a/15 and a lower groove engaging surface 13b coupled to one another by a rolling engagement body 13c. The body 13c may preferably be conical, but may also be cylindrical, pyramidal, or cubic. Body 13c may also function to transfer remaining loads from loadbearing extension 13a/15 into track 5 or through a load path from loadbearing extension 13a/15 to lower rolling surface 13b to lower track surface 5b, lower surface 4.

Figure 14C:
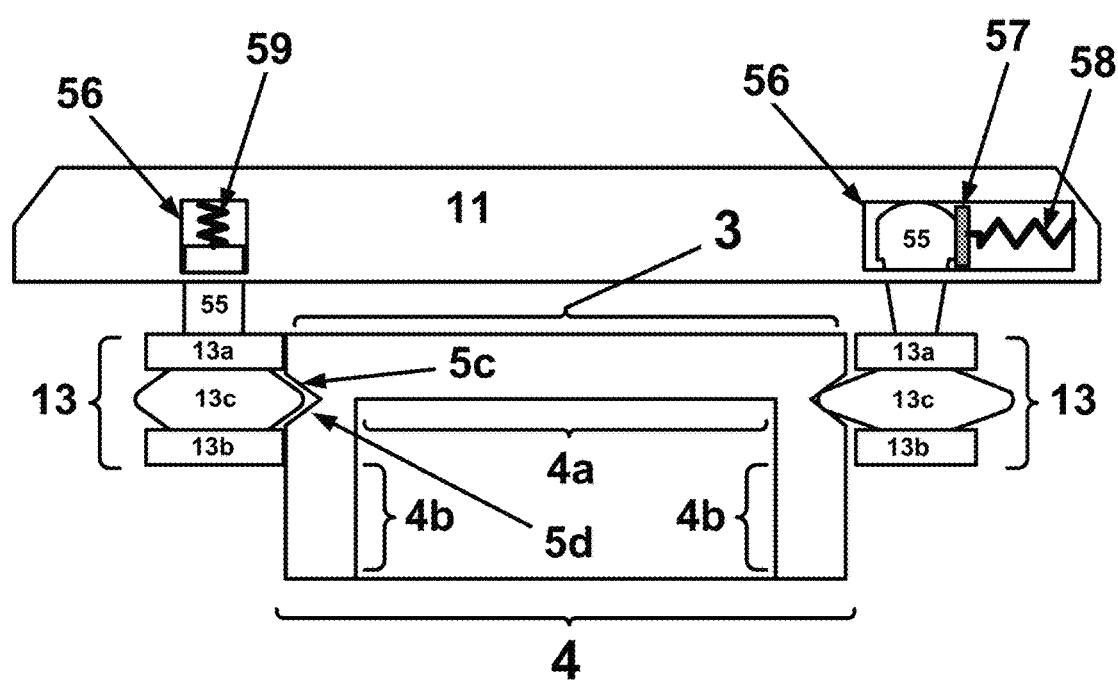

With reference to the illustrative embodiment of FIG. 14C, an exemplary carrier 11 may be provided with rollers 13 comprising an upper rolling surface 13a, a lower rolling surface 13b and a body rolling surface 13c. According to this illustrative embodiment, body rolling surface 13c has a larger diameter than either of rolling surfaces 13a or 13b. Accordingly, body rolling surface 13c may rollingly engage concavity track 5 which lies between upper surface 3 and surface 4a while being within the thickness of track 4. Thus, the body rolling surface 13c may rest upon one or both of upper concave track surface 5c and/or lower concave track surface 5d. While track 5 may be illustrated as substantially triangular in FIG. 14C, any cross section of track 5 may be provided for a complementarily shaped body roller 13c. In another embodiment, body roller 13c may have a diameter such that only one or none of rolling surfaces 13a and 13b contact platform surface 4b or 3. Alternatively, body roller 13c and roller surfaces 13a and 13b may all substantially contact platform 4 to allow for increased friction to maintain track adherence by carrier 11 and allow for increased load transfer. As previously described in FIG. 14A, spaces or gaps may exist between lower rolling surface 13b and platform 4. Additionally, due to the embodiment of a body roller 13c according to FIG. 14C, rolling surface 13a may also be spaced apart from platform 4 while carrier 11 is used on the platform 1.

An additional embodiment of carrier 11 may also be illustrated via FIG. 14C. For example, carrier 11 may have a carrier 55 to which rollers 13 rotatably couple. Within carrier 11 may be a displacement chamber or track 56 into which a translationally capable head of carrier leg 55 may be situated to move. Carrier leg 55 may be substantially held in place by a wall 57 coupled to a spring 58. According to an exemplary embodiment, carrier 11 with carrier leg 55 may utilize spring action to displace roller 13 about platform 1, track 5, and/or any other platform surfaces to couple carrier 11 to the rest of the system. The spring action carrier leg 55 may be implemented on some or all of carrier 11 legs to allow for flexible manipulation of the carrier rollers 13 about track 5. Additionally, according to this exemplary embodiment, spring action carrier leg 55 may allow for ease of coupling and removing carriers 11 to and from track 5 and/or platform 1. While carrier leg 55 may be configured to be held in place against a spring force, carrier leg 55 may be coupled directly to spring 58. Alternatively, carrier leg 55 may be a moveable construct in a first position in carrier 11 and a relatively non-moveable construct when in a second position in carrier 11, for example, carrier leg 55 may be coupled to an overhead spring 59 within a pocket 56 into which it is screwed (e.g., the carrier leg 55 is the male component that screws into the female component pocket 56). Thus, while screwed into carrier 11, carrier leg 55 may not displace and remain substantially fixed for use during loading and unloading of carrier 11 about platform 1. When unscrewed, carrier leg 55 may be moveable via overhead spring 59 so as to bend about platform 1 and/or track 5. According to this exemplary embodiment and the prior spring action embodiments, one or more such carrier leg 55, spring 58, overhead spring 59, slide channel/pocket 56, and spring wall 57 may be able to manifest themselves in interrelated and interchangeable constructions as means to flexibly mount carrier 11 about track 5 and/or platform 1.

Figure 16:
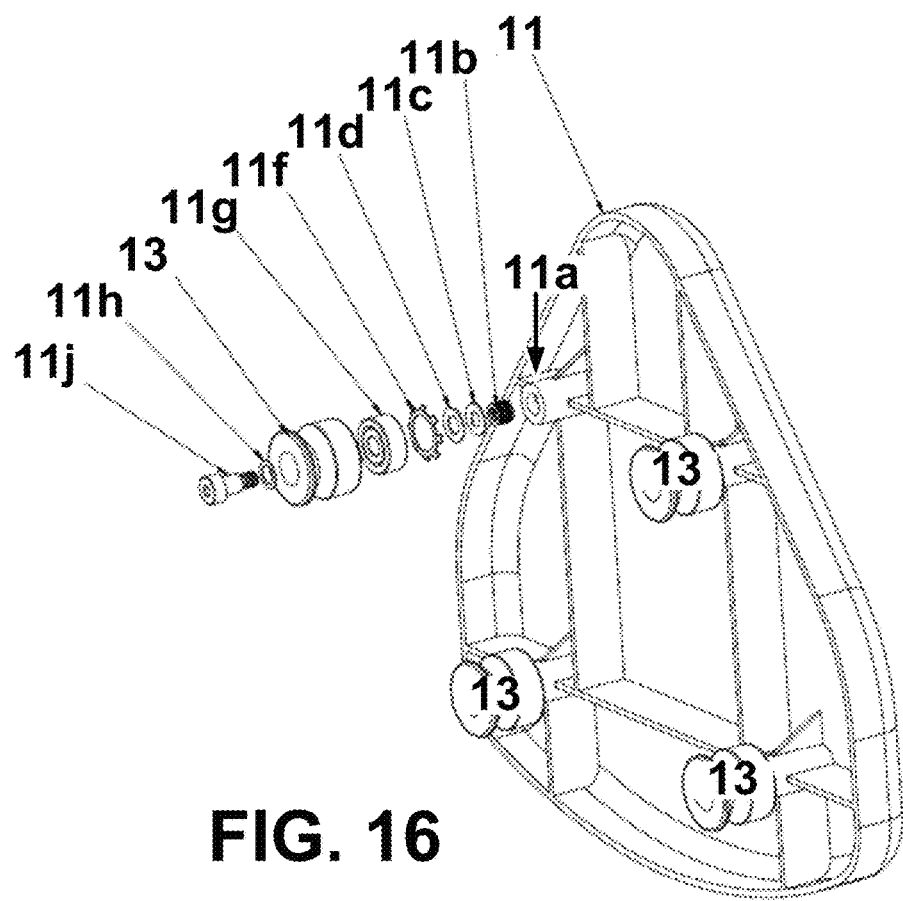
FIG. 16 is an exploded isometric view of a carrier and roller system according to exemplary embodiments of the present invention.
Figure 17A:
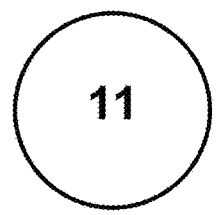
FIGS. 17A-G are an array of exemplary carriers as used on a platform according to exemplary embodiments of the present invention.
Figure 17B:
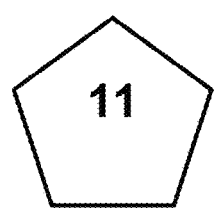
Figure 17C:
Figure 17G:
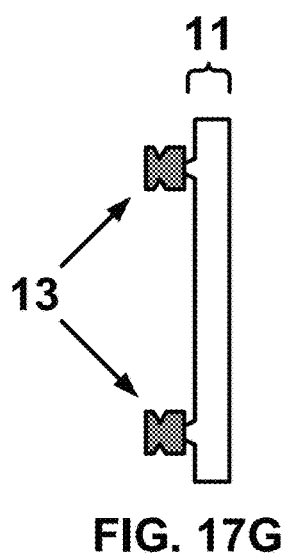
Figure 17D:
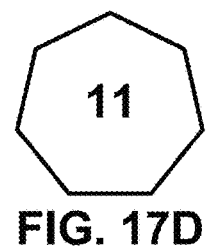
Figure 17E:
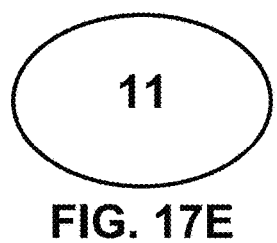
Figure 17F:
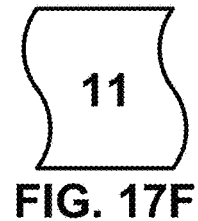

According to the illustrative embodiment of FIG. 16, an exemplary carrier 11 may be provided with a distally extending carrier arm 11a in which rollers 13 as previously disclosed may couple to the carrier 11. An exemplary roller 13 may be preferably made from a polymer, and more preferably an ultrahigh molecular weight polymer, and even more preferably, an ultra-high molecular weight (UHMW) polyethylene material. In another exemplary embodiment, carrier 11 may be coupled to roller 13 through a combination of rotation cascade 60 and coupler cascade 61. Rotation cascade 60 may be comprised of an insert sleeve 11b, preferably a heat set material or other thermoplastic or thermoset, a pair of washers 11c-d made up of a metal, preferably stainless steel, a self-locking internal retaining ring 11e, and a bearing 11f comprised of a plurality of ball bearings, each preferably made of plastic and metal, respectively, and more preferably an acetal polymer and stainless steel, respectively. While bearing 11f may be part of rotation cascade 60, it is not required for rotation of roller 13. When in use, bearing 11f is preferably of the open type. Coupler cascade 61 may comprise one or more of a shim 11g, preferably made of stainless steel, and a shoulder screw 11h. Those skilled in the art may recognize that the above components and order and arrangement may be varied to account for loading needs of carrier 11, rotational ease and efficiency of one or more roller 13, and/or a combination of such factors.

Figure 15A:
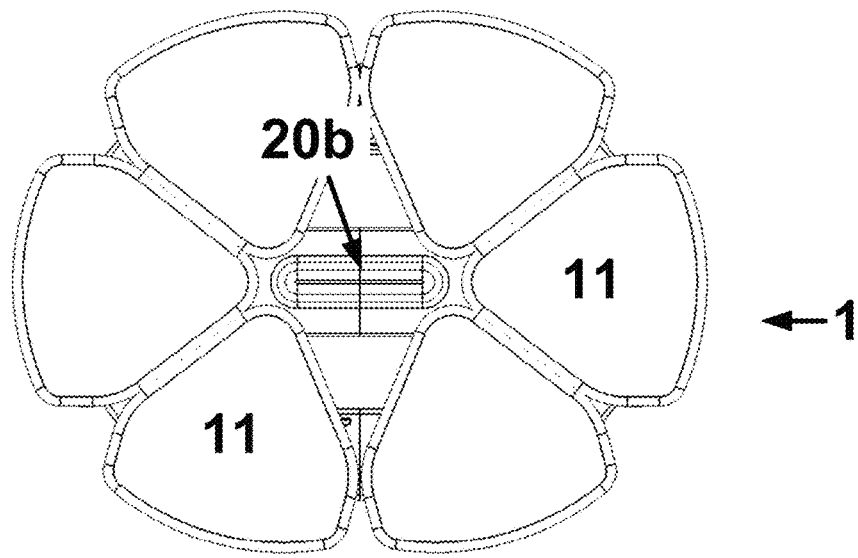
FIGS. 15A-B are plan views of an oblong lazy Susan structure and a supporting platform according to exemplary embodiments of the present invention.
Figure 15B:
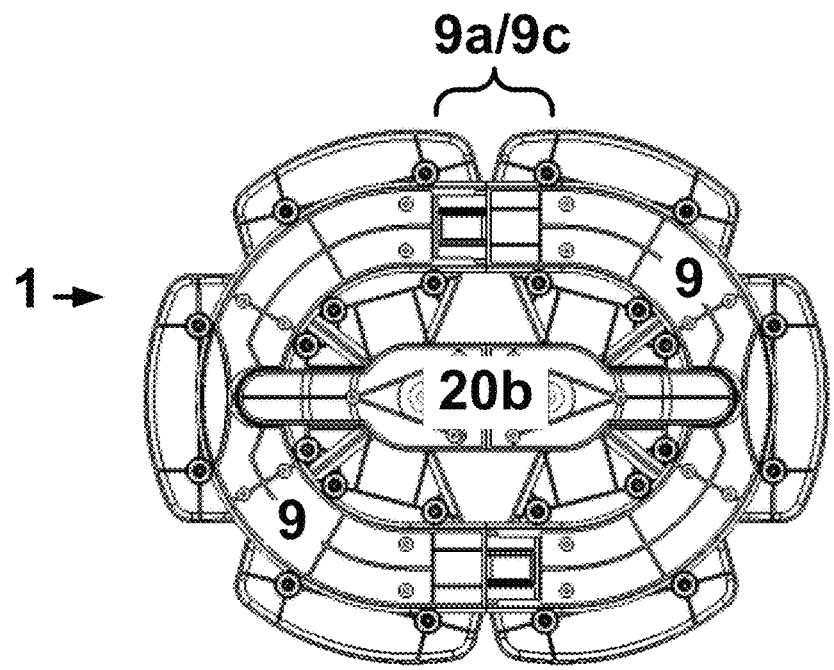

FIGS. 15A-B illustrate embodiments previously disclosed in which the segmentation capabilities of platform 1 may be utilized to reform oblong track 5 into a substantially circular track 5. An exemplary method of forming a circular track 5 from an oblong system comprised of platform 1 may be to remove main handle sections 20a and mechanically couple sub-handles 20b to one another to form a handle 20b to carry two curved portions 9 of track 5. As illustrated, an exemplary circular track 5 may accommodate the same or different carriers 11 according to needs. Where male and female joints 9a/9c may otherwise connect to one or more straight portions 7 of track 5, they connect to the corresponding joint of the adjacent curved portion 9. While the illustrative embodiments of FIGS. 15A-B may provide for straight lengths due to male/female joints 9a/9c, those skilled in the art may recognized other mechanical coupling arrangements wherein joining two curved portions 9 of track 5 may result in a perfect circular arrangement. Where the track 5, carrier 11, and rollers 13 disclosed are used in such a circular track 5 arrangement, the lazy Susan formed thereby may withstand additional loads and controlled movement of the carriers 11 during operation.

As previously disclosed, FIG. 17 provides an exemplary arrangement of carriers 11 as disclosed for an exemplary oblong lazy Susan that may contain any number of carriers 11 of any number of sizes and shapes to fit a particular purpose or purposes. Any of the aforementioned carrier configurations disclosed in FIG. 17 may apply equally to a carrier cover configured to be inserted into a port 81 of a carrier 11 as described with respect to FIG. 18.

Figure 19:
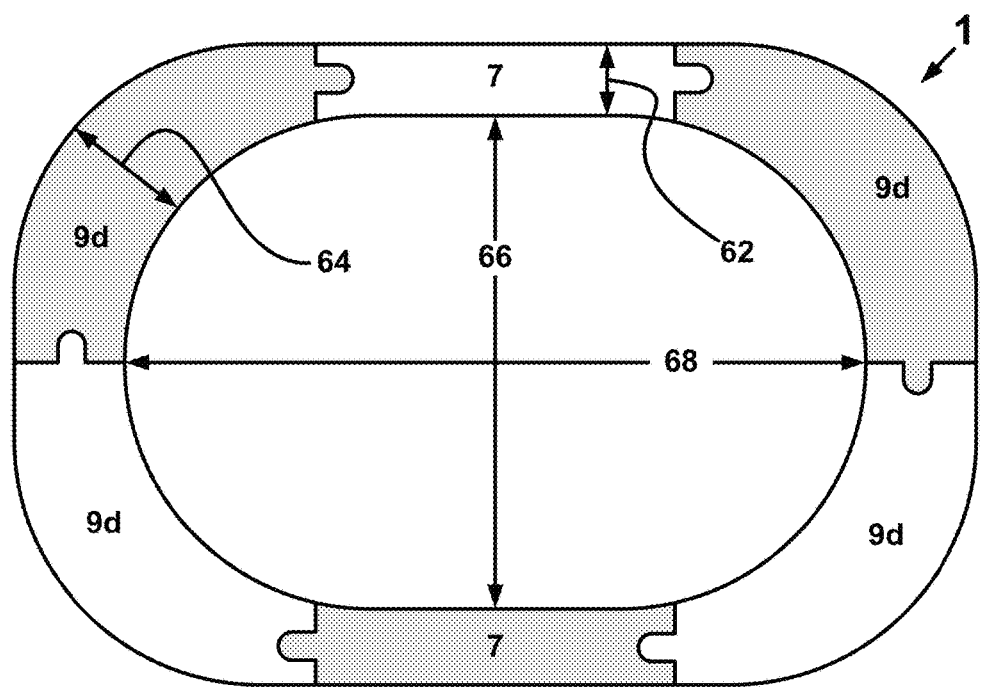
FIG. 19 is an exemplary embodiment of a platform of particular dimensioning for particular carrier loading.

According to the illustrative embodiment of FIG. 19, an exemplary platform 1 of oblong shape may be made of various segments 7 and 9, as previously disclosed, and/or segment parts 9d, as previously disclosed, and may possess various dimensions suitable for different purposes. For example, platform 1 may have a minor diameter 66 and a major diameter 68 measured from the furthest inside surfaces of platform 1 between segments 7 and 9 (or the junction of components 9d), respectively. Further, the width of the curved portion of segment 9 that is at or proximal to major diameter 68 may be a width 64 which is greater than the width 62 of segment 7. Width 64 may be larger than width 62 to accommodate a particular carrier 11 or arrangement of rollers 13 and/or roller surfaces 13a-c, about platform tracks 4, 4a-b and/or 5a-d. In an exemplary embodiment, a carrier 11 having only three rollers 13 may benefit from increased contact with platform 1 and tracks 4, 4a-b and/or 5a-d. Alternatively, segments 9d may have an exemplary width 64 at or about their radii of curvature and a width less than width 64 at those portions that are not curved. In an exemplary embodiment, by having a width 64 to width 62 ratio of greater than 1, the exemplary curved sections 9 and/or 9d of an exemplary platform 1 illustratively embodied by FIG. 19 may provide increased mobility capability and adaptability of a carrier 11 with three rollers 13 while ensuring adequate coupling is maintained between such carrier rollers 13 and platform 1. One or more of the exemplary carrier 11, roller 13, and track 4/5 embodiments described herein may be utilized in conjunction with the aforementioned platform 1 configuration illustratively represented by FIG. 19 and its related disclosures.

This present invention disclosure and exemplary embodiments, all of which being interrelated and interchangeable in terms of parts and means of assembly, are meant for the purpose of illustration and description. The invention is not intended to be limited to the details shown. Rather, various modifications in the illustrative and descriptive details, and embodiments may be made by someone skilled in the art. These modifications may be made in the details within the scope and range of equivalents of the claims without departing from the scope and spirit of the several interrelated embodiments of the present invention.

What is claimed is:

1. A moveable component for a track system, comprising:
a carrier; and
a pair of rollers coupled to one another by the carrier, wherein the rollers each include at least one rolling surface configured to engage opposing sides of a track, wherein the carrier has at least one flat surface, at least one curved surface, and at least one slotted surface for carrying an object.

2. The moveable component of claim 1, wherein at least one of the rollers is spring-loaded and biased toward the other.

3. The moveable component of claim 2, wherein the at least one spring-loaded roller includes an armature connected to the carrier via a pivot, wherein the armature is biased by a coil spring for coupling the at least one spring-loaded roller with a track.

4. The moveable component of claim 3 wherein the armature is connected to the carrier for rotation about a rotation axis orthogonal to a plane that is parallel to the at least one flat surface of the carrier.

5. A system, comprising:
a track system having at least one track component, wherein the at least one track component has a cross-section comprising an upper section and a lower section, the upper section being wider than the lower section;
a carrier; and
a pair of rollers coupled to one another by the carrier, wherein the rollers each include at least one rolling surface engaged opposing sides of the at least one track component.

6. The system of claim 5, wherein at least one of the rollers is spring-loaded and biased toward the other.

7. The system of claim 6, wherein the at least one spring-loaded roller includes an armature connected to a pivot of the carrier, wherein the armature is biased by a coil spring for coupling the at least one spring-loaded roller with the at least one track component.

8. The system of claim 7, wherein the armature is connected to the carrier for rotation about a rotation axis orthogonal to a plane that is parallel to the carrier.

9. The system of claim 6, wherein the at least one spring-loaded roller is spring biased toward an opposed roller that is not biased toward the at least one spring-loaded roller.

10. The carrier component of claim 6, wherein the at least one spring-loaded roller is connected via a fixed extension on an underside of the carrier.

11. The carrier component of claim 7, wherein the coil spring is connected to the carrier via a fixed extension on an underside of the carrier.

12. A track-mountable carrier, comprising
a first portion having at least a curved surface, a flat surface, and a slotted surface thereon, wherein the first portion attaches at least one item above the track-mountable carrier;
an armature and a spring interconnected to one another underneath the first portion; and
at least two rollers coupled to one another via at least one of the armature and the spring, wherein the spring biases at least one of the at least two rollers towards the other.

13. The track-mountable carrier of claim 12, wherein the at least one item is attached to the first portion via the slotted surface.

* * * * *